(12) United States Patent
Lu et al.

(10) Patent No.: US 8,365,262 B2
(45) Date of Patent: Jan. 29, 2013

(54) METHOD FOR AUTOMATICALLY GENERATING AND FILLING IN LOGIN INFORMATION AND SYSTEM FOR THE SAME

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 1048 days.

(21) Appl. No.: 12/265,783

(22) Filed: Nov. 6, 2008

(65) Prior Publication Data
US 2009/0265769 A1 Oct. 22, 2009

(30) Foreign Application Priority Data
Apr. 22, 2008 (CN) .......................... 2008 1 0104622

(51) Int. Cl.
G06F 7/04 (2006.01)
(52) U.S. Cl. ............ 726/6; 713/151; 713/161; 713/182; 726/5; 726/18; 726/19; 726/28
(58) Field of Classification Search .................... None
See application file for complete search history.

(56) References Cited

U.S. PATENT DOCUMENTS

| | | | |
|---|---|---|---|
| 7,155,739 B2* | 12/2006 | Bari et al. ......................... | 726/6 |
| 7,471,796 B2* | 12/2008 | Tomlinson ..................... | 380/280 |
| 2003/0154413 A1* | 8/2003 | Shigeeda ....................... | 713/202 |

* cited by examiner

Primary Examiner — Shewaye Gelagay
(74) Attorney, Agent, or Firm — Hammer & Associates, P.C.

(57) ABSTRACT

A system for automatically generating and filling login information to improve the security in storage and use of the login information. The system comprises a monitoring module, a registration module, and a login module; the monitoring module is coupled to the registration module and the login module; the monitoring module is adapted to check for an entry of login information corresponding to the identifier of the current page, and prompt a result to the user, and transmit a signal to the registration module and the login module to perform a registration and/or login operation; the registration module comprises a login information generation unit, a login information storage unit, and a first user confirmation unit; and the login module comprises a login information input unit and a second user confirmation unit. A method for the same is also disclosed.

23 Claims, 3 Drawing Sheets

METHOD FOR AUTOMATICALLY GENERATING AND FILLING IN LOGIN INFORMATION AND SYSTEM FOR THE SAME

FIELD OF THE INVENTION

The present invention relates to the field of information security, and more particularly, to a method for automatically generating and filling in login information and a system for the same.

BACKGROUND OF THE INVENTION

More and more daily activities are moved onto the network as the fast development of network and e-commerce technologies in recent years. For example, governmental affairs, banking transactions, and shopping can all be carried out online. Inevitably, some personal information or sensitive information, such as business secret, is transmitted through the network, and then is possibly associated with some malicious threats (e.g. viruses, hackers, phishing, and other frauds), which can bring loss or damages to legitimate online users.

The information security device is a small-sized hardware device with a processor and a memory. It communicates with the computer through a data communication interface of the computer. It provides functions of key generation, secure storage of keys, preset encryption algorithms, and anti-attack, etc. The calculation relating to keys is fully carried out within the information security device. The information security device typically communicates with the computer through a USB (Universal Serial Bus) interface for nowadays.

The information security device employs a PIN (Personal Identification Number) or biometrics (e.g. the fingerprint or iris) to authenticate users. Upon authentication, the user enters a PIN or his biometrics through the computer with which the information security device is connected. The information security device then verifies the user input. Only if the user input is correct, the user is allowed to use the information security device.

The operations that can be performed by the information security device mainly include data interacting (encrypting of data to be written to the device, or decrypting of data to be read from the device), authentication information processing, storing/verifying a password, storing/verifying a signature, storing/verifying a certificate, access right management, and presetting code and executing data computation. Presetting code includes presetting a user software fragment, which cannot be read out of the device and performs data computation within the device, and presetting a software protection application interface function, which is an interface-level function between the device and the software developer application.

In the prior art, the information security device can save the username/password entered by the user on a website. It will fill in the username/password automatically the next time the user logs onto that website.

However, the username and password are regular and easy to crack in general because they are specified by the user. A longer username and password is hard to remember for users. In addition, the user may have to attempt many different combinations of username and password to register successfully.

SUMMARY OF THE INVENTION

The present invention provides a method for automatically generating and filling in login information and a system for the same, which improve the security of the storage and use of login information, and eliminate the possibility of wrong input, and the need of remembering login information.

The system for automatically generating and filling in login information comprises a monitoring module, a registration module, and a login module, in which the registration module and the login module are coupled to the monitoring module respectively; the monitoring module is adapted to check for corresponding login information to an identifier of a current website page in the registration module in real time and notify a user of a result, and signal to the registration module and/or the login module to perform registering and/or login operations; the registration module comprises a login information generation unit for receiving the signaling for generating login information and then generating login information automatically to complete registration; a login information storage unit for storing the login information generated by the login information generation unit and obtaining and storing a page identifier associated with the login information; and a first user confirmation unit for signaling to the login information generation unit to generate login information in accordance with an instruction of a user; and the login module comprises a login information input unit for automatically filling corresponding login information to an identifier of the current page stored in the login information storage unit in appropriate fields on the page to complete login operations; and a second user confirmation unit for triggering the login information input unit to perform operations after receiving the signal of finding corresponding login information to the identifier of the current page by the monitoring module and receiving a confirmation instruction from the user.

The login module further comprises a login information selection unit for selecting an entry of login information and transmitting the entry of login information to the login information input unit for performing login operations if there is more than one entry of login information corresponding to the identifier of the current page.

The system further comprises a user setting module coupled to the registration module, the login module, and the monitoring module, for accepting the settings of the user for the checking, generating, storing, and inputting of the login information and the storing of the identifier of the page; accordingly, the login information storage unit is adapted to store the generated login information and obtain the identifier of the page in accordance with these settings.

The login information generation unit is adapted to generate the login information automatically, in accordance with the settings, after receiving the signal of generating an entry of login information.

The login information input unit is adapted to fill corresponding login information to the identifier of the current page in appropriate fields on the page automatically to complete login operations, in accordance with the settings.

The settings include a time interval for checking for corresponding login information to the identifier of the current page in the registration module in real time by the monitoring module.

The settings include the number of characters of the login information.

The settings include the content contained in the login information, which further includes a particular string of characters.

The settings further include the location of the content in the login information.

The settings include the setting on how to fill in the login information.

The login information generation unit generates the login information automatically using a random number obtaining algorithm with a random factor, after receiving the signal of generating login information.

The random factor is a time value or a number of times.

The system further comprises a login information management module for modifying or deleting entries of login information and related identifiers of pages stored in the login information storage unit, or adding a new entry of login information and a related identifier of a page to the login information storage unit.

The system further comprises a prompt module coupled to the monitoring module, the registration module, and the login module respectively, for prompt an error to the user.

The system further comprises an authentication module coupled to the registration module and the login module respectively, for authenticating the user; if he is a legitimate user, allow him to continue using of the system; otherwise, disallow subsequent use of the system to perform operations, which involve the automatic generation and/or input of the login information.

The system further comprises an authentication information input module and a template information storage module coupled to the authentication module respectively, with which the system authenticates the user by collating a PIN or biometrics input by a user with a previously stored template; the authentication information input module is adapted to accept the PIN or biometrics from the user; the template information storage module is adapted to store PINs or biometrics of legitimate users.

The biometrics includes at least one of a fingerprint, an iris, a retina, a palm print, a face, and a voice.

The system further comprises an encryption module coupled to the login information generation unit and the login information storage unit respectively, for encrypting the login information generated by the login information generation unit using an encryption algorithm before storing the login information in the login information storage unit; and a decryption module coupled to the login information storage unit and the login information input unit respectively, for decrypting the login information related to the identifier of the current page and encrypted with the encryption algorithm using a decryption algorithm corresponding to the encryption algorithm, before automatically filling the login information on the page by the login information input unit.

The encryption/decryption algorithm is at least one algorithm selected from the group consisting of DES (Data Encryption Standard), 3DES (Triple DES), AES (Advanced Encryption Standard), RSA (Rivest-Shamir-Adleman), HASH, RC4 (Rivest Cipher 4), MD5 (Message Digest algorithm 5), SHA-1 (Secure Hash Algorithm-1), TEA (Tiny Encryption Algorithm), and ECC (Elliptic Curve Cryptography).

The login information includes a username and a password.

The identifier of the page includes a URL, (Uniform Resource Locator) of a webpage.

The first user confirmation unit and the second user confirmation unit include at least one component selected from the group consisting of a button, a fingerprint scanner, a voice switch, a press sensor, a photoelectric sensor, and a temperature sensor.

In another aspect, the present invention provides a method for automatically generating and filling in login information, which comprises the steps of:

checking for corresponding login information to an identifier of a current page in real time; and prompting a user if there exists no such login information, and generating and storing an entry of login information with the identifier of the page to complete registration operations upon receiving a confirmation instruction of the user; or prompting the user also if there exists such login information, and filling the login information in appropriate fields on the page to complete login operations upon receiving a confirmation instruction of the user.

The method further comprises a step of providing settings for the checking, generating of the login information, the storing of the login information and the related identifier of the page, and the filling of the login information, before checking for the login information.

The settings include a setting for a time interval of the checking, a setting for the number of characters of the login information, a setting for the content contained in the login information, a setting for a location of storing the login information and the related identifier of the page, and/or a setting for how to fill in the login information.

The content contained in the login information is a particular string of characters; accordingly, the settings further include a setting for the specific location of the string of characters in the login information.

The login information is generated using a random number obtaining algorithm with a random factor.

The login information is automatically generated by combining a result generated using a random number obtaining algorithm with a random factor with a particular string of characters.

The random factor is a time value or a number of times.

The method further comprises a step of selecting an entry of login information after finding more than one entry of login information relating to the identifier of the current page.

The method further comprises a step of authenticating the user before checking for the login information; if the user is legitimate, allow the operations of generating and/or filling in login information; otherwise disallow to perform such operations.

The authenticating is carried out by collating a PIN or biometrics input by the user with a previously stored template.

The biometrics includes at least one of a fingerprint, an iris, a retina, a palm print, a face, and a voice.

The method further comprises a step of encrypting the login information using an encryption algorithm before storing the generated login information, and a step of decrypting the login information using a corresponding decryption algorithm before filling in the login information.

The encryption/decryption algorithm is at least one algorithm selected from the group consisting of DES (Data Encryption Standard), 3DES (Triple DES), AES (Advanced Encryption Standard), RSA (Rivest-Shamir-Adleman), HASH, RC4 (Rivest Cipher 4), MD5 (Message Digest algorithm 5), SHA-1 (Secure Hash Algorithm-1), TEA (Tiny Encryption Algorithm), and ECC (Elliptic Curve Cryptography).

The login information includes a username and a password.

The identifier of the page includes a URL, (Uniform Resource Locator) of a webpage.

The first user confirmation unit and the second user confirmation unit include at least one component selected from the group consisting of a button, a fingerprint scanner, a voice switch, a press sensor, a photoelectric sensor, and a temperature sensor.

The system and method of the present invention improve the security in use and storage of the login information because the generated login information is not as regular as fully user-defined login information. Meanwhile, the wrong input of the user is prevented. In addition, the user does not need to worry about forgetting the login information.

BRIEF DESCRIPTION OF THE DRAWINGS

The present invention can be further understood from the following description in conjunction with the appended drawings. In the drawings.

DETAILED DESCRIPTION OF THE PREFERRED EMBODIMENTS

The present invention is further described with the embodiments and the drawings below.

Figure 1:
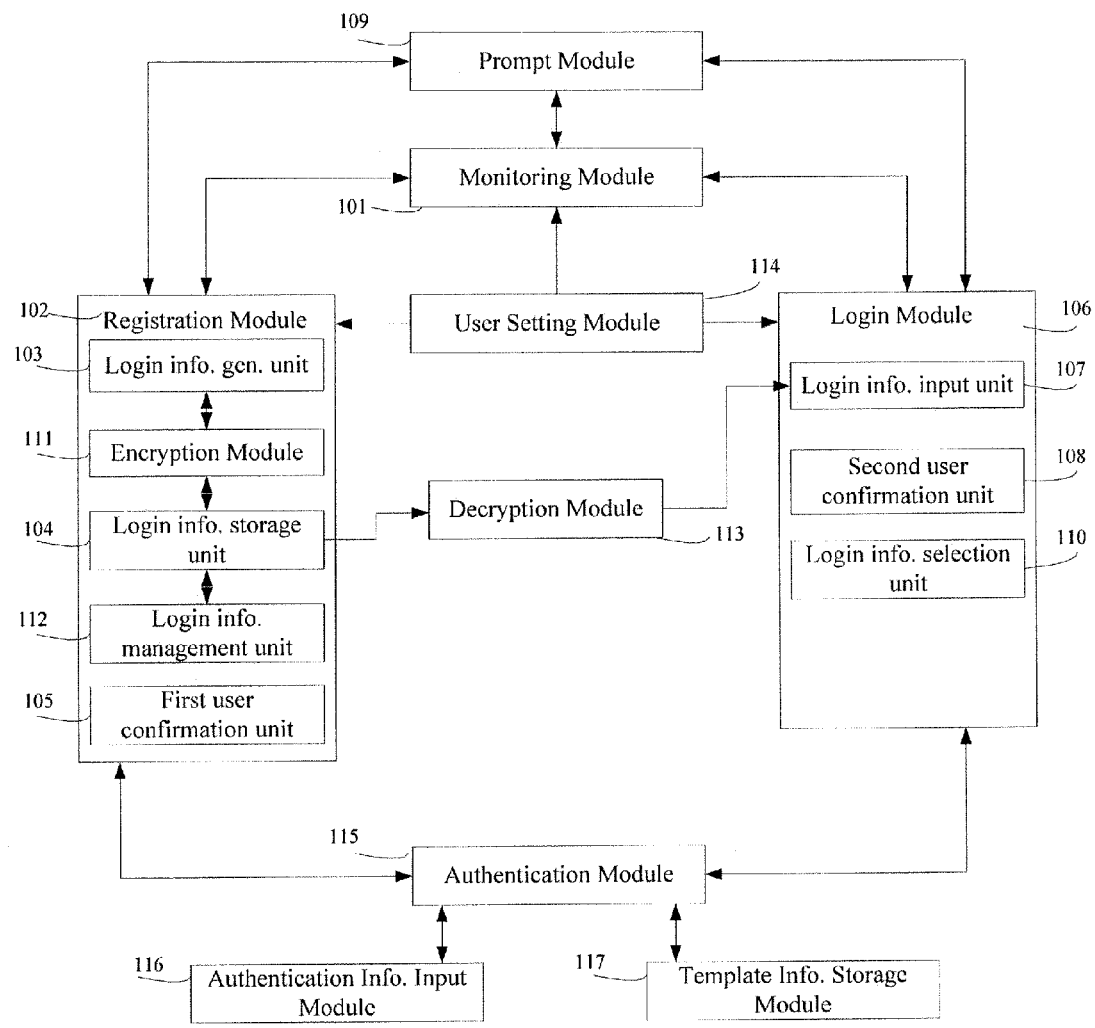
FIG. 1 is a block schematic of the system of the first embodiment of the present invention.

Referring to FIG. 1, the present invention provides a system for automatically generating and filling in login information, which comprises a monitoring module 101, a registration module 102, and a login module 106. The registration module 102 further comprises a login information generation unit 103, a login information storage unit 104, and a first user confirmation unit 105. The login module 106 further comprises a login information input unit 107 and a second user confirmation unit 108.

The monitoring module 101, coupled to the registration module 102 and the login module 106, is adapted to check for corresponding login information to the identifier of the current page in the registration module 102 in real time and prompt the user of a result, and signal to the registration module or the login module to perform registering and/or login operations. The prompt can be rendered through a display screen, or by a voice.

The login information generation unit 103 is adapted to automatically generate an entry of login information to complete registration after receiving a signal of generating login information. The login information can be generated using a linear congruence generator and a random number generator, with the system time as a seed. The generated login information can be a long string of characters. The string of characters can further be combined with other information, such as the domain name of a website, the system date/time, or a particular string of characters specified by the user, to form an entry of login information.

The login information storage unit 104 is adapted to store the entry of login information generated by the login information generation unit and obtain and store a related identifier of the page.

The first user confirmation unit 105 is adapted to signal to the login information generation unit for generating an entry of login information in accordance with an instruction of the user.

The login information input unit 107 is adapted to automatically fill corresponding login information in the appropriate fields on the page to complete login operations, in accordance with the identifier of the page stored in the login information storage unit.

The second user confirmation unit 108 is adapted to trigger the login information input unit to perform operations, after receiving a signal of finding out a corresponding entry of login information to the identifier of the current page by the monitoring module, and receiving a confirmation instruction of the user.

The login module 106 as shown in FIG. 1 can further comprise a login information selection unit 110. If there is more than one entry of login information relating to the identifier of the current page, the user can select one of them using the login information selection unit 110.

Furthermore, the system can further comprise a user setting module 114 which is coupled to the monitoring module 101, the registration module 102, and the login module 106, and is adapted to accept and store user settings. The settings are for the operations like the checking and generating of the login information, the storing of the login information and the related page identifier, and the filling of the login information etc. For example, the user can set to save the generated entries of login information under the path D:\dong\logins and save the page identifiers obtained by the login information storage unit 104 under the path D:\dong\pageidentifiers.

The monitoring module 101 checks for an entry of login information relating to the identifier of the current page in the registration module 102 in real time in accordance with the settings. For example, if the user sets the time interval for checking to 100 ms, then the monitoring module checks for the entry of login information every 100 ms.

The login information generation unit 103 automatically generates an entry of login information in accordance with the settings after receiving a signal of generating the login information. For example, if the user sets the number of characters of the login information to 19, the generated login information is truncated to a string of 19 characters and sent to the login information storage unit 104 for storing therein. Or, if the user sets the login information which must begin with a string "Kevin", then the string "Kevin" is appended to the login information generated using an algorithm. The formed new string is sent to the login information storage unit 104 for storing therein by the login information generation unit 103.

The login information input unit 107 automatically fills the login information corresponding to the identifier of the current page in the appropriate fields on the page to complete login operations, in accordance with the settings. For example, the user can specify an entry of login information as the default login information, if there exists more than one entry of login information, corresponding to a login page.

The settings include, but not limit to, the time interval for checking for the login information corresponding to the current page, the number of characters that are finally generated, the content contained in the generated login information, and the way in which the login information is filled (e.g. the precedence of filling a username or a password, using which combination of username and password as a default entry of login information, the characters of the login information are filled one by one or all together at a time). The content contained in the login information can be a particular string of characters, such as the keyword of the domain name of the current website that is being logged on (e.g. example below), or a particular string of characters specified by the user (e.g. john). The settings can also encompass the setting for the location of the string of characters in the login information. Assuming that the user specifies that the string "john" is included in the login information following the $3^{rd}$ character and the raw login information generated using an algorithm is "102589", the resulted login information shall be "102john589". The user can also specify that the particular content to be included in the login information shall be located at the start, the end, or other positions.

After receiving a signal of generating an entry of login information, the login information generation unit 103 computes the login information using a random number obtaining algorithm with a random factor to generate a result as an entry of login information automatically. Or, the result can be further combined with a keyword of a domain name or a particular string specified by the user as described above to form an entry of login information automatically. The random factor can be a time value or a number of times, such as the current system time or the current number of times the entry of login information has been generated. For example, a username can be a combination of the keyword of the domain name of the website that is being logged on, the current system date/time, and a 6-character random number, as well as a password. Assuming that the website that is being logged on by the user is www.example.com, the resulted login username and password can be "example080322001234" and "example080322004321" respectively (080322 for date). To get a longer entry of login information, the system time (hh/mm/ss) can be incorporated here.

The system can further comprise a login information management module 112 coupled to the login information storage unit 104 of the registration module 102, that is adapted to manage the entries of login information and related page identifiers in the login information storage unit. The user can modify or delete any entries of login information and related page identifiers, or add a new entry of login information and a related page identifier to the login information storage unit.

Additionally, the system can further comprise a prompt module 109 which is coupled to the monitoring module 101, the registration module 102, and the login module 106, and is adapted to prompt an error to the user.

Furthermore, the system can further comprise an authentication module 115 which is coupled to the registration module 102 and the login module 106 respectively and to a corresponding authentication information input module 116 and a corresponding template information storage module 117, and is adapted to authenticate the user. If the user is verified to be not legitimate, the operations of generating and filling in the login information cannot be allowed.

The authentication information input module is coupled to the authentication module for accepting the PIN or biometrics (e.g. the fingerprint, iris, retina, palm print, face, or voice feature) entered by the user, comprising a PIN input box or a fingerprint scanner.

The template information storage module is coupled to the authentication module for storing the PINs or biometrics of legitimate users (e.g. the fingerprint, iris, retina, palm print, face, or voice feature). In particular, the template information storage module can comprise a database of fingerprints.

Furthermore, the system comprises an encryption module 111 coupled to the login information generation unit 103 and the login information storage unit 104 for encrypting the generated login information using an encryption algorithm before storing the information.

Accordingly, the system comprises a decryption module 113 coupled to the login information storage unit 104 and the login information input unit 107 for decrypting the encrypted login information using a decryption algorithm corresponding to the encryption algorithm described above and transmitting the information to the login information input unit 107 before filling in the login information by the login information input unit 107.

For the present invention, the authentication module 115, the authentication information input module 116, the template information storage module 117, the encryption module 111, and the decryption module 113 are all optional. If the system of the present invention includes these modules, the security will be increased significantly.

The system of the present invention can employ at least one algorithm of DES, 3DES, AES, RSA, HASH, HMAC, RC4, MD5, SHA-1, TEA, and ECC to encrypt/decrypt data.

The login information of the present invention includes, but not limit to, the username and the password.

The identifier of the page of the present invention includes a URL, (Uniform Resource Locator), such as http://www.example.com or http://www.example.com/reg.html.

The user confirmation unit of the present invention can comprise at least one component of a button, a fingerprint scanner, a voice switch, a press sensor, a photoelectric sensor, and a temperature sensor. With these components, the user can give an instruction to the system to perform a particular operation.

Figure 2:
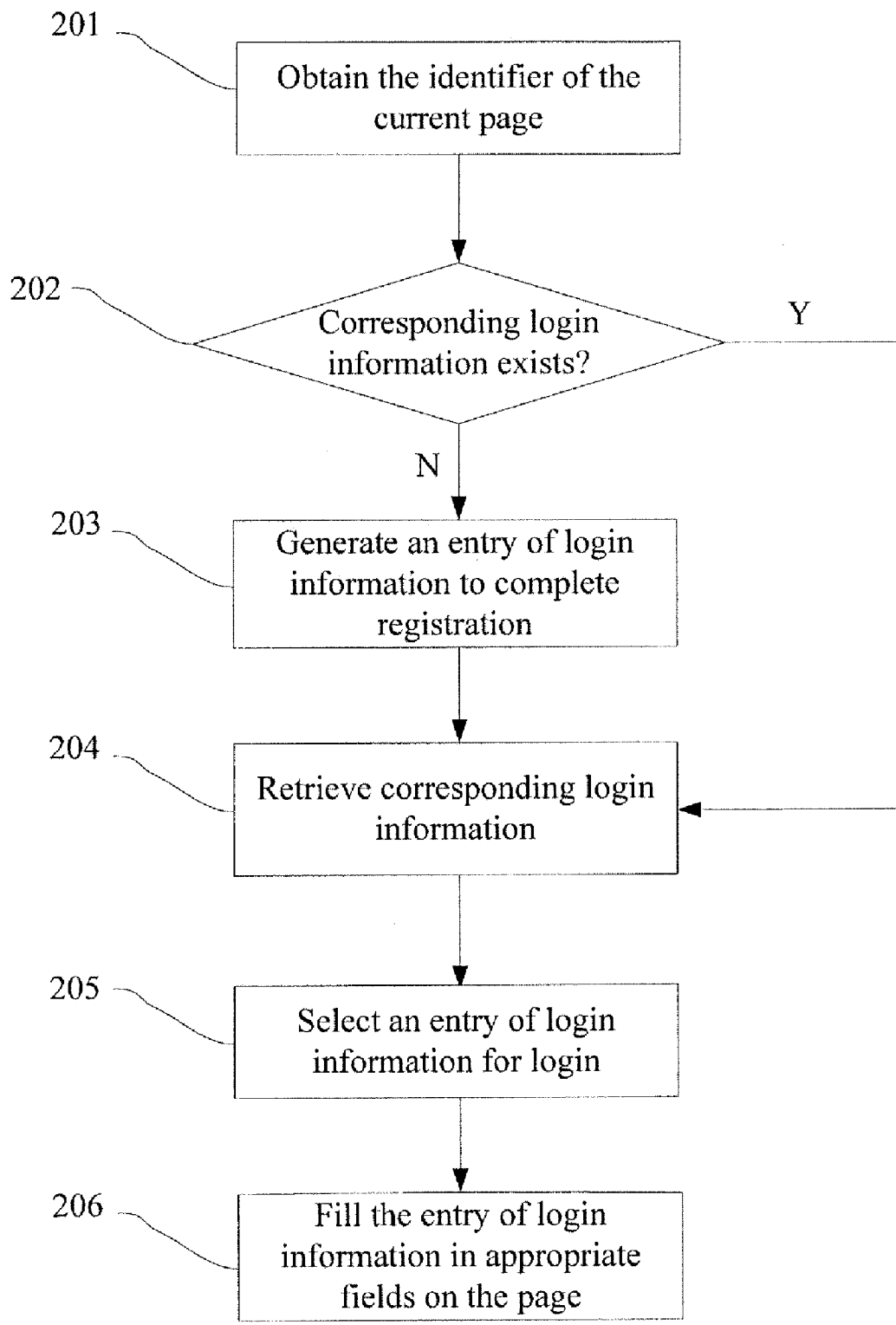
FIG. 2 is a flow schematic of the method of the second embodiment of the present invention.

Referring to FIG. 2, the present invention also provides a method for automatically generating and filling in login information, which comprises the steps of:

Step 201: obtaining the identifier of the current page;

Step 202: checking for an entry of login information corresponding to the identifier of the current page in real time; if there exists such an entry of login information, prompting the user and proceeding to Step 204 directly; otherwise, prompting the user and proceeding to Step 203;

Step 203: computing and generating an entry of login information automatically, and storing the generated login information and the related page identifier to complete registration, by using a random number obtaining algorithm with a random factor (a system time value or the number of times the login information has been generated), after receiving a confirmation instruction sent via a button on a device by the user from a registration page;

Step 204: retrieving login information corresponding to the page identifier, after receiving a confirmation instruction sent via a button on a device by the user from the login page;

Step 205: selecting an entry of login information for login operation;

Step 206: filling the selected login information in the appropriate fields on the current page to complete login operation.

If only one entry of login information corresponding to the page identifier is retrieved, it is not necessary to perform the selecting operation.

In Step 203, the login information is automatically generated using a random number obtaining algorithm with a random factor. Or, a keyword of the domain name of the website and/or a particular string of characters specified by the user can further be included in the raw login information. The random factor can be a time value or a number of times, such as the current system date/time or the number of times the login information has been generated. For example, the username can be a combination of the keyword of the domain name of the website that is being logged on, the current system date/time, and a 6-character random number, so can the password. Assuming that the website that is being logged on by the user is www.example.com, the generated username and password can be "example080322001234" and "example080322004321" respectively (080322 for date here). To get a longer entry of login information, the system time (hh/mm/ss) can also be included.

The random number obtaining algorithm can be an existing algorithm or a user-defined algorithm such that the algorithm can be used to compute a random string of characters from a random factor.

To improve the security of the present invention, the steps of authenticating and encrypting/decrypting can also be incorporated.

Figure 3:
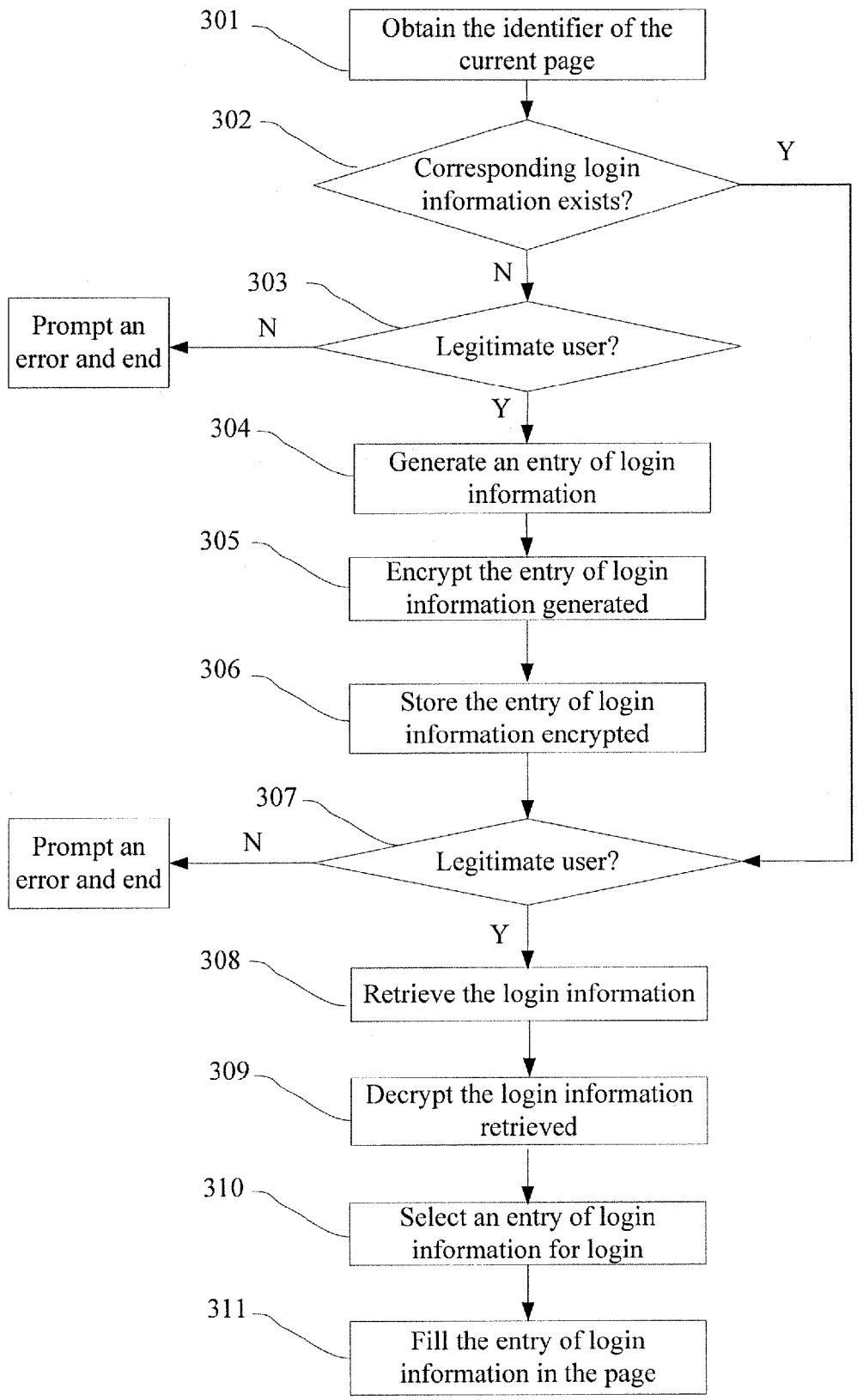
FIG. 3 is a flow schematic of the method of the third embodiment of the present invention.

Referring to FIG. 3, the method provided by the present invention can also comprise the steps of:

Step 301: obtaining the identifier of the current page;

Step 302: checking for an entry of login information corresponding to the identifier of the current page in real time; if there exists such an entry of login information, prompting the user and proceeding to Step 307 directly without going through Step 303 to 306; otherwise, prompting the user and proceeding to Step 303;

Step 303: prompting the user to enter a PIN for authentication after receiving a confirmation instruction sent via a sensitive element (or at least one of the fingerprint scanner, the voice switch, the press sensor, the photoelectric sensor, and the temperature sensor) by the user from the registration page; if the authentication result is negative, prompting the user of failing to authenticate him and then to generate an entry of login information, and ending the operation;

Step 304: generating an entry of login information automatically for the user if the authentication result is positive;

For example, to generate a username, the information security device first obtains a time value from the computer system, and then computes using an HMAC algorithm with a key of the user and the time value as follows (K for a key, T for a time value):

$$HOTP(K,T)=\text{Truncate}(HMAC\text{-}SHA\text{-}1(K,T))$$

1) the function HMAC-SHA-1 is used to figure out a 20-byte string, with K and T as parameters;

2) the function Truncate is used to figure out a 6-character string by truncating the 20-byte string;

3) obtaining the keyword of the domain name of the website and a system date, and combining these data elements with the 6-character string to form a username;

Similarly, a password can be generated;

Step 305: encrypting the login information with at least one algorithm of DES, 3DES, AES, RSA, HASH, HMAC, RC4, MD5, SHA-1, TEA, and ECC;

Step 306: storing the encrypted login information with a related identifier of the current webpage to complete registration;

Step 307: prompting the user to enter a PIN for authentication after receiving a confirmation instruction sent via a sensitive element on a device by the user from the login page; if the authentication result is negative, prompting an error to the user, failing to fill in the login information automatically for him, and ending the operation;

Step 308: retrieving login information corresponding to the identifier of the current page if the authentication result is positive;

Step 309: decrypting the encrypted login information with a decryption algorithm matching the encryption algorithm described above;

Step 310: selecting an entry of login information for login operation;

Step 311: filling the login information in the appropriate fields on the page to complete login operation.

In this embodiment, only if a correct PIN is entered by the user, the subsequent operations are allowed. The authentication mechanism can also be replaced with a biometrics (e.g. the fingerprint, the iris, the retina, the palm print, the face, or the voice feature) verification procedure.

In the second and third embodiments (as shown in FIGS. 2 and 3), the step of accepting user settings can also be included. The settings include, but not limit to, the time interval for checking for the login information corresponding to the current page, the number of characters that are finally generated, the content contained in the generated login information, and the way in which the login information is filled (e.g. the precedence of filling a username or a password, using which combination of username and password as a default entry of login information, the characters of the login information are filled one by one or all together at a time). The content contained in the login information can be a particular string of characters, such as the keyword of the domain name of the current website that is being logged on (e.g. "example" below), or a particular string of characters specified by the user (e.g. "john"). The settings can also encompass the setting for the location of the string of characters in the login information. Assuming that the user specifies that the string "john" is included in the login information following the $3^{rd}$ character and the raw login information generated using an algorithm is "102589", the resulted login information shall be "102john589". The user can also specify that the particular content to be included in the login information shall be located at the start, the end, or other positions.

The system and method of the present invention can be implemented through an information security device, and a portable USB flash memory disk, etc.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A system for automatically generating and filling in login information of a website page, wherein the system comprises a monitoring module, a registration module, and a login module, in which the registration module and the login module are coupled to the monitoring module respectively; said monitoring module is adapted to check for an entry of login information corresponding to an identifier of a current website page in said registration module in real time and prompt a result to a user, and signal to said registration module and said login module to perform a registering and a login operation;

said registration module comprises a login information generation unit for receiving a signal of generating an entry of login information and then generating the entry of login information automatically to complete registration computing a random string of characters from a random factor which is a time value or a number of times, and then using the characters as an entry of login information or using a combination of the characters and a keyword of a domain name or a particular string specified by the user as an entry of login information; a login information storage unit for storing the entry of login information generated by said login information generation unit, and obtaining and storing a page identifier associated with the entry of login information; and a first user confirmation unit for transmitting a signal of generating an entry of login information to said login information generation unit in accordance with an instruction of a user;

said login module comprises a login information input unit for automatically filling the entry of login information corresponding to the identifier of the current page stored in the login information storage unit in appropriate fields on the page to complete the login operation; and a second user confirmation unit for triggering the login information input unit to perform an operation after receiving a signal of finding out the entry of login information corresponding to the identifier of the current page by said monitoring module and receiving a confirmation instruction from the user; and wherein the system further comprises a user setting module coupled to said registration module, said login module, and said monitoring module respectively, for accepting and storing the settings of the user for the checking, generating, storing, and inputting of the entry of login information and the storing of the identifier of the page; the settings include a time interval for checking for the entry of login information corresponding to the identifier of the current page in said registration module in real time by said monitoring module, the number of characters of the entry of login information, the content contained in the entry of login information, which further includes a particular string of characters, and the location of the content in the entry of login information; said login information storage unit is adapted to store the generated entry of login information and obtain the identifier of the page in accordance with the settings; said login information generation unit is adapted to generate the entry of login information automatically in accordance with the settings, after receiving the signal of generating the entry of login information; said login information input unit is adapted to fill the entry of login information corresponding to the identifier of the current page in the appropriate fields on the page automatically to complete the login operation, in accordance with the settings.

2. The system of claim 1, wherein said login module further comprises a login information selection unit for selecting an entry of login information and transmitting the entry of login information to said login information input unit to perform the login operation if there exists more than one entry of login information corresponding to the identifier of the current page.

3. The system of claim 1, wherein said login information generation unit generates the entry of login information automatically using a random number obtaining algorithm with a random factor, after receiving the signal of generating the entry of login information.

4. The system of claim 3, wherein said random factor is a time value or a number of times.

5. The system of claim 1, wherein the system further comprises a login information management module for modifying or deleting an entry of login information and a related identifier of a page stored in said login information storage unit, or adding a new entry of login information and a related identifier of a page to said login information storage unit.

6. The system of claim 1, wherein the system further comprises a prompt module coupled to said monitoring module, said registration module, and said login module respectively, for prompting an error to the user.

7. The system of claim 1, wherein the system further comprises an authentication module, an authentication information input module, and a template information storage module; said authentication module is coupled to said registration module and said login module respectively, for authenticating the user; if a result is positive, allow the user to continue using of the system; otherwise, disallow subsequent use of the system to perform a operation including the automatic generation and input of the entry of login information; said authentication information input module and said template information storage module are coupled to said authentication module respectively, for authenticating the user by collating a PIN or biometrics input by the user with a previously stored template PIN or biometrics; said authentication information input module is adapted to accept the PIN or biometrics from the user; said template information storage module is adapted to store PINs or biometrics of legitimate users.

8. The system of claim 1, wherein the system further comprises an encryption module coupled to said login information generation unit and said login information storage unit respectively, for encrypting the entry of login information generated by said login information generation unit using an encryption algorithm before storing the entry of login information in said login information storage unit; and a decryption module coupled to said login information storage unit and said login information input unit respectively, for decrypting the entry of login information related to the identifier of the current page and encrypted with said encryption algorithm using a decryption algorithm corresponding to said encryption algorithm, before automatically filling the entry of login information by said login information input unit.

9. The system of claim 1, wherein the entry of login information includes a username and a password.

10. The system of claim 1, wherein the identifier of the page includes a URL (Uniform Resource Locator) of a webpage.

11. A method for automatically generating and filling in login information, wherein the method comprises the steps of:
checking for an entry of login information corresponding to an identifier of a current page in real time by a monitor module;
prompting a user if there exists no such an entry of login information by the monitor module, and generating and storing an entry of login information with the identifier of the page to complete a registration operation upon receiving a confirmation instruction of the user by a login information generation unit and a login information storage unit; or prompting the user also if there exists such an entry of login information by the monitor module, and filling the entry of login information in appropriate fields on the page to complete a login operation upon receiving a confirmation instruction of the user by a login information input unit for automatically filling the entry of login information corresponding to the identifier of the current page stored in the login information storage unit;
wherein the generating of the entry of login information comprises the steps of: receiving a signal generating an entry of login information;
computing a random string of characters from a random factor which is a time value or a number of times;
using the random string of characters as an entry of login information or using a combination of the characters and a keyword of a domain name or a particular string specified by the user as an entry of login information; and
accepting and storing, by user setting module, settings of the user for the checking, generating, storing, and inputting of the entry of login information and the storing of the identifier of the page; the settings include a time interval for checking for the entry of login information corresponding to the identifier of the current page in said registration module in real time by said monitoring module, the number of characters of the entry of login information, the content contained in the entry of login information, which further includes a particular string of characters, and the location of the content in the entry of login information; storing, by the login information storage unit, the generated entry of login information and obtain the identifier of the page in accordance with the settings; generating, by the login information generation unit, the entry of login information automatically in accordance with the settings, after receiving the signal of generating the entry of login information; filling, by the login information input unit, the entry of login information corresponding to the identifier of the current page in the appropriate fields on the page automatically to complete the login operation, in accordance with the settings.

12. The method of claim 11, wherein the method further comprises a step of providing settings for the checking and generating of the entry of login information, the storing of the entry of login information and the related identifier of the page, and the filling of the entry of login information, before checking for the entry of login information.

13. The method of claim 12, wherein said settings include: a time interval of the checking, a a number of characters of the entry of login information, a content contained in the entry of login information, and a location of storing the entry of login information and the related identifier of the page.

14. The system of claim 13, wherein said content contained in the entry of login information is a particular string of characters; accordingly, said settings further include a specific location of the string of characters in the entry of login information.

15. The method of claim 12, wherein the entry of login information is generated using a random number obtaining algorithm with a random factor.

16. The method of claim 12, wherein the entry of login information is automatically generated by combining a result produced using a random number obtaining algorithm with a random factor with a particular string of characters.

17. The method of claim 15, wherein said random factor is a time value or a number of times.

18. The method of claim 11, wherein the method further comprises a step of selecting an entry of login information after finding out more than one entry of login information corresponding to the identifier of the current page.

19. The method of claim 11, wherein the method further comprises a step of authenticating the user before checking for the entry of login information; if the user is legitimate, allow the operations of generating and/or filling in the entry of login information; otherwise, disallow to perform such operations.

20. The method of claim 19, wherein the authenticating is carried out by collating a PIN or biometrics input by the user with a previously stored template PIN or biometrics.

21. The method of claim 11, wherein the method further comprises a step of encrypting the entry of login information using an encryption algorithm before storing the entry of login information that is generated, and a step of decrypting the entry of login information that is encrypted, using a decryption algorithm corresponding to said encryption algorithm before filling in the entry of login information.

22. The method of claim 11, wherein the entry of login information includes a username and a password.

23. The method of claim 11, wherein the identifier of the page includes a URL of a webpage.

* * * * *